United States Patent [19]

French et al.

[11] Patent Number: 5,027,901
[45] Date of Patent: Jul. 2, 1991

[54] METHOD OF OIL WELL CORROSION INHIBITION VIA EMULSIONS AND EMULSIONS THEREFORE

[75] Inventors: Eddie C. French, Manchester; William F. Fahey, St. Louis; James G. Harte, Ellisville, all of Mo.

[73] Assignee: Petrolite Corporation, St. Louis, Mo.

[21] Appl. No.: 403,635

[22] Filed: Sep. 6, 1989

[51] Int. Cl.$^5$ .............................................. E21B 41/02
[52] U.S. Cl. ................................... 166/310; 166/371; 166/902; 252/8.555
[58] Field of Search ............... 166/312, 310, 902, 371; 252/8.555

[56] References Cited

U.S. PATENT DOCUMENTS

| | | | |
|---|---|---|---|
| 3,105,050 | 9/1963 | Fischer | 166/902 X |
| 3,343,599 | 9/1967 | Eddins | 166/21 |
| 3,347,789 | 10/1967 | Dickson | 166/312 X |
| 3,490,237 | 1/1970 | Lissant | 60/217 |
| 3,523,826 | 8/1970 | Lissant | 134/22 |
| 3,617,095 | 11/1971 | Lissant | 302/66 |
| 3,712,862 | 1/1973 | Budrant et al. | 166/310 X |
| 3,712,863 | 1/1973 | Budrant et al. | 166/310 X |
| 3,732,166 | 5/1973 | Lissant | 166/304 |

*Primary Examiner*—George A. Suchfield
*Attorney, Agent, or Firm*—Jeffrey S. Boone; Kenneth Solomon

[57] ABSTRACT

A method of inhibiting corrosion in an oil well comprises introducing into the well a pourable emulsion comprising a. 50-95% of a discontinuous aqueous phase (such as ordinary water); and
b. 5-50% of a continuous oil phase (such as kerosene or similar hydrocarbon) containing a corrosion inhibiting compound (such as an imidazoline).

This method results in more consistent corrosion protection, even if longer treatment intervals are used.

15 Claims, No Drawings

METHOD OF OIL WELL CORROSION INHIBITION VIA EMULSIONS AND EMULSIONS THEREFORE

BACKGROUND OF THE INVENTION

This invention relates to methods of controlling corrosion in oil wells. In particular, it relates to such methods in which known anticorrosive agents are rendered more economically effective.

Crude oil, as it is produced from underground oil formations, is a mixture of various components including oil and from about 1 to about 95 percent water. The presence of water causes several problems for oil producers, one of the more significant being corrosion of metal in the oil production equipment.

When an oil well is drilled, steel pipe called "casing" is inserted into the hole and cemented in place to maintain the integrity of the hole. A second pipe, called the "production tubing" or simply "tubing", is then inserted into the well in the center of the casing, for withdrawal of the oil. At first, natural pressure in the formation may drive the oil through the tubing to the surface. However, once the natural pressure is dissipated, it becomes necessary to pump the oil to the surface. One typical means of pumping is to attach an electric pump to the bottom of the tubing. A more common means is to attach a mechanical pump to the bottom of the tubing with a rod (typically made of steel) called a "sucker rod" connecting the pump to a power source on the surface. The space between the casing and the tubing, called the "annulus", is used for introducing chemicals such as corrosion inhibitors to the well. The space inside the tubing contains the sucker rod (if one is used) and is the conduit for the oil being pumped to the surface. The bottom of the pump reaches into the collected borehole fluids, consisting of oil and usually also water at the bottom of the well and pumps the liquid to the surface, through the tubing.

Because failure of the casing can be difficult or impossible to repair (resulting in the need to drill a new well), and failure of the pump, tubing, or sucker rod can cost thousands of dollars in parts, labor, and lost production, control of corrosion is extremely important. In response to this need, numerous chemicals have been proposed for addition to the well fluids to prevent corrosion. In conventional practice, these chemicals are typically dissolved in a solvent, blended with a surfactant, and pumped into the annulus of the well. This may be followed with a "flush" of 1 to 000 liters of water. To the extent that an emulsion of the corrosion inhibitor in the flush water is formed, it will be an oil-in-water emulsion. Long term experience has taught that applications need to be frequent and if more than about one week apart (sometimes as short as 2-3 days apart) will lead to greatly increased corrosion. Even if the quantity of inhibitor is increased, the duration of the effective treatment is not increased. Further, these chemicals are expensive and excessive treatment can cause troublesome crude oil emulsions.

Another drawback of conventional treatments is that immediately after application the produced fluids have a very high (excessive) level of corrosion inhibitor. The level of corrosion inhibitor then rapidly falls so that by the next treatment the level is very low (insufficient). This irregular level of inhibitor leads to crude oil emulsions early in the cycle and corrosion in the later part of the cycle.

Therefore, it would be advantageous to provide a more efficient means of preventing corrosion in an oil well.

U.S. Pat. No. 3,732,166 (Lissant - Petrolite) discloses a method of cleaning wells by introducing a high-internal-phase-ratio emulsion (HIPRE) containing carbon disulfide (a paraffin solvent) to the well. This reference does not mention corrosion inhibiting compounds. U.S. Pat. No. 3,343,599 (Eddins - Petrolite) teaches reducing the porosity of oil and gas formations by applying a particular HIPRE to a well. This patent does not mention corrosion inhibiting compounds. U.S. Pat. No. 3,523,826 (Lissant - Petrolite) teaches a pipe cleaning "pig" made of a highly viscous HIPRE. At column 3, lines 43-45, it mentions that a corrosion inhibitor can be added. U.S. Pat. No. 3,617,095 discloses a system for transporting solids in a pipeline by using HIPREs. At column 3, lines 36-37, the possible inclusion of a corrosion inhibitor is mentioned. U.S. Pat. No. 3,490,237 discloses a thixotropic fuel made from a HIPRE. The patent discusses the inclusion of numerous specific corrosion inhibitors at column 3, line 66 to column 7, line 30. A brochure entitled "Questions and Answers—ENERSPERSE TM " (bearing a 1989 publication date) vaguely describes an oil well corrosion treatment system in which one of the claimed benefits is the use of less surfactant to produce a dispersion of the corrosion inhibiting compound in water and the ability to tailor the treatment to the needs of each well.

SUMMARY OF THE INVENTION Briefly, in one aspect the invention comprises a method of inhibiting corrosion in an oil well by introducing into the well an emulsion comprising an equal or major portion of a discontinuous aqueous phase and a minor or equal portion of a continuous oil phase containing a corrosion inhibiting compound.

In another aspect, the invention comprises the emulsion used in the above method.

The method of the invention allows for effective control of corrosion with unusually long intervals between applications. Compared to conventional treatment methods, the instant invention offers better corrosion protection, longer intervals between treatments, and/or lower treatment costs.

DETAILED DESCRIPTION OF THE INVENTION

In this specification and claims, numerical values are not critical unless otherwise stated. That is, the numerical values may be read as if they were prefaced with the word "about" or "substantially".

The emulsions of the invention have a discontinuous aqueous phase and a continuous oil phase. The terms "discontinuous" and "continuous" are used in their ordinary sense in emulsion chemistry and the terms "internal phase" and "external phase", may be considered synonyms, respectively, of "discontinuous phase" and "continuous phase".

The term "aqueous phase" is used in its more colloquial sense of a phase which is not soluble in the oil phase. That is, "aqueous phase" is not intended to mean literally only water. For instance, highly polar fluids such as alcohols or alcohol-water mixtures would be suitable. However, the relative cost of such fluids other than water dictate that in all but the most unusual applications, the aqueous phase will be water. While highly purified water such as distilled or deionized water is quite usable, ordinary tap water is less expensive and offers no significant disadvantages.

Water such as municipal waste treatment plant discharge water is also usable and in some locations may be obtained at no cost. Further, river water may be used with minimal or no purification. Of particular note is the fact that water produced from oil wells (which may contain some oil) may be used. This source of water is advantageous because it may be obtained at the well site (avoiding the cost of transporting the water) and because disposal of such water is often a problem due to its salt or residual oil content (this use reduces the volume to be disposed).

The aqueous phase may contain various auxiliary ingredients such as water soluble corrosion inhibitors, scale inhibitors, and biocides. Salts such as sodium chloride or calcium chloride, can be added to increase the specific gravity of the emulsion. Various alcohols or salts may be added to depress the freezing point of the aqueous phase if they are to be transported or stored in cold weather.

The term "oil phase" is also used in its more colloquial sense and is intended to mean a relatively non-polar substance which is not soluble in the aqueous phase. Thus, materials such as petroleum distillates (e.g., kerosene, gasoline, naphtha, and most aliphatic solvents, etc.), food oils, and mineral oils may be used. The low cost and easy availability of kerosene make it an ideal choice for the oil phase.

The oil phase contains a corrosion inhibiting amount of an oil soluble corrosion inhibiting compound. By "corrosion inhibiting amount" is meant an amount which, when incorporated into the emulsion, will permit measurable corrosion inhibition when introduced into an oil well. By "oil soluble" is meant that the compound is soluble in the oil phase (the oil phase may contain cosolvents to assist in the solubility of the compound in the oil phase). By "corrosion inhibiting compound" is meant a compound or mixture of compounds which can prevent corrosion in an oil well.

Such oil soluble corrosion inhibiting compounds include those typically added to wells in conventional treating processes. These materials are well known to those skilled in the art and include carboxylic acids and derivatives such as aliphatic fatty acid derivatives, imidazolines and derivatives (including amides), quaternary ammonium salts, rosin derivatives, amines, pyridine compounds, trithione compounds, heterocyclic sulfur compounds, quinoline compounds, or salts, quats, or polymers of any of these, etc. Examples of suitable inhibitors include primary, secondary, and tertiary monoamines; diamines; amides; polyethoxylated amines, diamines or amides; salts of such materials; and amphoteric compounds. Other examples include imidazolines having both straight and branched alkyl chains. A specific example is

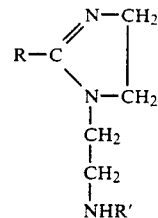

wherein R is the residue of a fatty acid and R' is a fatty acyl group or H.

Quaternary ammonium compounds often are used in mixtures, for instance, dicooodimethyl quaternary ammonium chlorides mixed with soya or tallow trimethyl quaternaries. Rosin derivatives are typically abietic acid derivatives such as palustric acid, neoabietic acid, dehydroabietic acid, dihydroabietic acid, tetrahydroabietic acid, levopimaric acid, dextropimaric acid, and isodextropimaric acid. Of particular interest are those compounds such as imidazolines and amides, which in addition to their action as corrosion inhibitors act as emulsification agents. These compounds eliminate the need for a separate emulsification agent and thereby reduce the chance of manufacturing errors and lower the cost of the product. Particularly preferred corrosion inhibiting compounds are the reaction products of fatty acids (such as tall oil acid) and polyamines (such as diethylenetriamine).

If the corrosion inhibiting compound does not act as an emulsification agent, a separate emulsification compound is required. Such materials are well known in the art and include ionic and nonionic emulsifiers. Particularly preferred species include alkoxylated amines, glycols, or alcohols, as well as substituted phenols. The emulsification compound is added in sufficient quantity to provide a relatively stable, non-separating emulsion.

The products of the invention are water-in-oil emulsions. The term "emulsion" is used in its classic sense to mean a stable, non-separating dispersion.

The dispersions of the invention may be of the high internal phase ratio emulsion (HIPRE) type or of the near-HIPRE type. HIPRE emulsions are those wherein the internal phase exceeds the packing density possible for spheroidal droplets, and thus have in excess of about 75 volume percent internal phase. Near-HIPRE emulsions are those having at least about 50 volume percent internal phase, but which are not true HIPREs. There is not a sharp distinction between the properties of HIPREs and near-HIPREs. Rather, there is a gradual change as the ratio of the phases is altered.

The emulsions of the invention are pourable. By pourable is meant that if they are put in the annulus of a well, without subjecting them to shear, they will be sufficiently non-viscous that they will fall to the collected borehole fluids at the bottom of the well (this may be some 1,000 to 2,000 meters below the surface). The near-HIPREs are invariably pourable unless a thickening agent is added. The HIPREs become unpourable as the internal phase approaches 95 volume percent, depending, inter alia, on the separate viscosities of the continuous and discontinuous phases. Generally, the internal phase of the emulsion should not exceed 90, preferably 80, and more preferably 70 volume percent of the emulsion.

The near-HIPREs can be made by techniques known for many years to those skilled in the art. HIPREs can be made by newer, but still well known techniques. Techniques useful for making HIPREs can also be used to make near-HIPREs. Relevant information concerning suitable aqueous phase and oil-phase materials, emulsification compounds, and emulsification techniques and equipment can be found in the following literature, as well as the reference cited therein (all of which is hereby incorporated by reference):

| | |
|---|---|
| CA 1,132,908 | (Aronson - Unilever) |
| EP 0,279,498 | (Cain - Unilever) |
| EP 0,279,499 | (Cain - Unilever) |
| GB 2,194,166 | (Bradley - Petrolite) |
| US 3,343,599 | (Eddins - Petrolite) |
| US 3,523,826 | (Lissant - Petrolite) |
| US 3,539,406 | (Lissant - Petrolite) |
| US 3,565,817 | (Lissant - Petrolite) |
| US 3,684,251 | (Bowling - United States) |
| US 3,700,594 | (Lissant - Petrolite) |
| US 3,732,166 | (Lissant - Petrolite) |
| US 4,018,426 | (Mertz - Petrolite) |

Attention is particularly called to the list of references in the aforementioned CA 1,132,908.

The method of the invention is carried out by introducing the emulsion to an oil well, preferably through the annulus. A flush (i.e., subsequent introduction of another fluid, such as water) is generally not necessary, but can be used.

The collected borehole fluids in the annulus of the well generally comprise a predominately crude oil layer floating on top of a predominately water layer. Although not directly observed, the emulsion of the invention is thought to usually become situated primarily at the interface of the crude oil and water layers since its density is usually between that of crude oil and water. However, if it is desired to place the emulsion at the extreme bottom of the well (for instance, to place inhibitors below the pump), the emulsion can be easily weighted by adding a density increasing substance such as a salt to the aqueous phase.

The emulsions of the invention are used in an effective amount. By "effective amount" is meant an amount sufficient to reduce corrosion in an oil well. Although well conditions, production rate, treatment intervals, emulsion stability, choice of corrosion inhibiting compound, concentration of corrosion inhibiting compound in the oil phase, and concentration of oil phase in the emulsion, all have an effect on the required quantity of emulsion, generally about 1 to 10,000, desirably 4 to 1,000, and preferably 8 to 500 liters per treatment is used. Alternatively, generally about 1 to 500, desirably 2 to 100, and preferably 5 to 20 parts of emulsion per part of produced fluid are used.

Although there is no definitive answer as to why, the method of the present invention permits longer intervals between treatments than is possible with conventional treatment programs. For instance, in a given well, a conventional treatment program may require treatment, for example, once every seven days. However, using the same corrosion inhibiting compound in the method of the invention may extend the treatment intervals to, for instance, once every several weeks or months. Given the cost of labor and equipment to drive to and treat wells which are frequently in difficult to access areas, the use of the invention results in a substantial cost savings in the treatment program in addition to improved corrosion protection.

The cost savings of the invention is further amplified by the fact that conventional treating systems use large quantities of organic solvents to dilute the corrosion inhibiting compound. In contrast, in the instant invention, the majority of that solvent is replaced by the aqueous phase of the emulsions. As mentioned above, the aqueous phase can be water, including produced water or other waste water. This also results in a cost savings since water is less expensive than organic solvents.

The emulsions of the invention can be prepared at a central site and transported to the wells, or in a preferred embodiment, they can be prepared using equipment stored or mounted on a vehicle which is also used to deliver the emulsion to the well site. If the emulsions are made in relatively small quantities, it will be particularly convenient to formulate the emulsion introduced to a well to the particular needs of that well. Thus, a treatment driver could separately blend the emulsion for each well based on data relating to the corrosion problems unique to each well. This results in both costs savings by avoiding unnecessary use of chemicals and cost savings by ensuring adequate protection of well equipment.

Although the emulsions of the invention are "stable", the degree of stability is dependent on several factors such as oil well temperature, the nature and quantity of emulsifiers, the ratio of the phases, and method of preparation. By using large quantities of extremely stable emulsions it may be possible to extend treatment intervals to exceedingly long intervals. For instance, it may be possible to completely fill the annulus with emulsion and have a treatment life of perhaps a year or more.

The invention will be further described in the following examples. In the examples, all parts and percentages of aqueous and oil phases are by volume. All other parts and percentages are by weight unless otherwise specified.

PREPARATION OF EMULSION

The emulsions of the invention used in the examples were prepared by the following general method.

1. The oil phase (kerosene) and the corrosion inhibiting compound were premixed without a separate surfactant or emulsifier to form a base stock.
2. The base stock was pumped at a metered rate to an emulsion storage tank, from which it was recirculated through a pump, a static mixer, and back to the emulsion storage tank.
3. While maintaining circulation of the base stock, water was pumped at a metered rate to the static mixer and an emulsion was formed.
4. With the base stock and water feeds adjusted to produce the appropriate ratio of internal phase to external phase, emulsion was withdrawn from the recirculating loop and put into containers for transportation to a well site.

EXAMPLE 1

Following the general procedures above, an emulsion was made having 70% internal phase (water only) and 30% external phase. The external phase comprised 50% kerosene (as a solvent), 35% of a conventional amide/imidazoline reaction product of a tall oil derived carboxylic acid and a polyamine, and 15% of a fatty acid dimer derived polycarboxylic acid. This yielded an overall formulation for the emulsion of:

| | |
|---|---|
| Water | 70.0% |
| Solvent | 15.0% |
| Amide/Imidazoline | 10.5% |
| Polycarboxylic acid | 4.5% |
| Total | 100.0% |

A series of oil wells in the Permian Basin area of west Texas were treated with this emulsion by introducing 2 gallons (7.6 liters) to the annulus of each well, followed by flushing with 2 barrels (318 liters) of produced water. The treatment was repeated at weekly intervals for a total of four treatments. Once each week the corrosion rate of the produced fluids was measured using dynamic linear polarization techniques (at corrosion rates less than 1 mpy [25 μm/year] the accuracy of this method is ±25%). The natural uninhibited corrosion rates were estimated by a cathodic polarization scan after imposition of a 50 mA anodic current to remove any inhibitor film. Data showing the average corrosion rate for each well are reported in Table I.

COMPARATIVE EXAMPLE 1

A conventional oil-soluble corrosion inhibitor was formulated using the same amide/imidazoline and polycarboxylic acid of Example 1. The overall formulation of the inhibitor was:

| | |
|---|---|
| Solvent | 81.6% |
| Amide/Imidazoline | 9.4% |
| Polycarboxylic acid | 5.0% |
| Dispersant | 2.5% |
| Surfactant | 1.5% |
| Total | 100.0% |

Using identical quantities and other treatment procedures, this conventional inhibitor solution was applied to the same wells as the emulsion of Example 1. The results are reported in Table I.

TABLE I

| | Average Corrosion Rate | | | | | | | | | |
|---|---|---|---|---|---|---|---|---|---|---|
| | Well 1 | | Well 2 | | Well 3 | | Well 4 | | Well 5 | |
| Inhibitor | mpy | (μm/y) | mpy | (μm/y) | mpy | (μm/y) | mpy | (μm/y) | mpy | (μm/y) |
| None* | 60 | (1520) | 53 | (1350) | 46 | (1170) | 38 | (960) | 27 | (690) |
| Comp. Ex. 1* | 0.10 | (2.5) | 0.05 | (1.3) | 0.20 | (5.1) | 0.15 | (3.8) | 0.05 | (1.3) |
| Ex. 1 | 0.20 | (5.1) | 0.05 | (1.3) | 0.15 | (3.8) | 0.50 | (12.7) | 0.15 | (3.8) |

*Not an example of the invention.

EXAMPLE 2

In a manner similar to Example 1, an emulsion of the invention was prepared having an overall formulation of:

| | |
|---|---|
| Water | 70.0% |
| Solvent | 15.0% |
| Amide/Imidazoline | 10.0% |
| Polycarboxylic acid | 5.0% |
| Total | 100.0% |

A single treatment of 8 gallons (30.3 liters) of the emulsion was introduced into the annulus of a series of Permian Basin wells (no flush was used) and the corrosion measured by weight-loss coupons installed in the produced fluids flow line near the well discharge. The data are reported in Table II.

COMPARATIVE EXAMPLE 2

Using the conventional corrosion inhibitor formulation of Comparative Example 1, the wells of Example 2 were treated with 2 gallons (7.6 liters) of solution, followed by a 2 barrel (318 liters) flush of produced water, once a week for a total of 4 treatments, providing the same total volume of formulation as Example 2. This treatment protocol is well accepted in the art as the most efficient way to apply a conventional oil-soluble corrosion inhibitor. The data are reported in Table II.

TABLE II

| | Average Corrosion Rate | | | | | | | |
|---|---|---|---|---|---|---|---|---|
| | Well 6 | | Well 7 | | Well 8 | | Well 9 | |
| Inhibitor | mpy | (μm/y) | mpy | (μm/y) | mpy | (μm/y) | mpy | (μm/y) |
| Comp. Ex. 2* (4 2-gallon treatments) | 0.11 | (2.8) | 0.38 | (9.6) | 0.21 | (5.3) | 0.68 | (17.3) |
| Ex. 2 (1 8-gallon treatment) | 0.26 | (6.6) | 0.31 | (7.9) | 0.29 | (7.4) | 0.19 | (4.8) |

*Not an example of the invention.

COMPARATIVE EXAMPLE 2A

Due to the impracticability of deliberately subjecting an expensive oil well to highly corrosive conditions, this is a hypothetical example. The wells of Example 2 are treated with a single 8-gallon (30.3 liter) application of the conventional corrosion inhibitor formulation of Comparative Example 1 (the same formulation used in Comparative Example 2). During the first week there is excellent corrosion protection, but the high concentration of the formulation causes undesirable emulsification of the produced fluids. Shortly after about 1 week following the treatment, the corrosion protection falls to unacceptably low levels. By the end of 4 weeks there is essentially no corrosion protection.

EXAMPLE 3

A well in the Permian Basin was treated with a single application of 8 gallons (30.2 liters) of the emulsion of Example 2 (no flush was used). The corrosion rate was determined at frequent intervals using the electrochemical methods of Example 1 and the results are reported in Table III.

TABLE III

| Inhibitor | Corrosion Rate | | | | | | | | | | | | | | | |
|---|---|---|---|---|---|---|---|---|---|---|---|---|---|---|---|---|
| | 8 Days | | 15 Days | | 21 Days | | 28 Days | | 35 Days | | 42 Days | | 60 Days | | 55 Days | |
| | mpy | (μm/y) | mpy | (μm/y) | mpy | (μm/y) | mpy | (μm/y) | mpy | (μm/y) | mpy | (μm/y) | mpy | (μm/y) | mpy | (μm/y) |
| None* | 5.0 | (127) | 1.5 | (38) | 3.5 | (89) | 11.5 | (292) | 2.0 | (51) | 4.0 | (102) | 8.5 | (216) | 2.8 | (71) |
| Ex. 2 | 0.15 | (3.8) | <0.1 | (<2.5) | <0.1 | (<2.5) | 1.8 | (45.7) | 0.2 | (5.1) | 0.25 | (6.3) | 0.33 | (8.4) | 0.75 | (19.0) |
| % Protection | 97 | | 93 | | 97 | | 84 | | 90 | | 94 | | 96 | | 73 | |

*Not an example of the invention.

EXAMPLE 4

Following the general procedure of Example 3, except that 6¾ gallons (25.5 liters) of the emulsion of Example 2 was used, another Permian Basin well (having particularly severe corrosion) was treated and the corrosion measured. The results are reported in Table IV.

TABLE IV

| Inhibitor | Corrosion Rate | | | | | | | | | |
|---|---|---|---|---|---|---|---|---|---|---|
| | 1 Day | | 7 Days | | 13 Days | | 20 Days | | 28 Days | |
| | mpy | (μm/y) | mpy | (μm/y) | mpy | (μm/y) | mpy | (μm/y) | mpy | (μm/y) |
| None* | 18 | (457) | 20 | (508) | 45 | (1143) | 10 | (254) | 50 | (1270) |
| Ex. 2 | 0.7 | (17.8) | 4.5 | (114.3) | 1.0 | (25.4) | 0.5 | (12.7) | 0.5 | (12.7) |
| % Protection | 96 | | 78 | | 98 | | 95 | | 99 | |

*Not an example of the invention.

What is claimed is:

1. A method of inhibiting corrosion in an oil well comprising introducing to the annulus of a well an effective amount of a pourable emulsion comprising
   50 to 95 volume percent of a continuous oil phase, said oil phase containing a corrosion inhibiting amount of an oil soluble corrosion inhibiting compound.
2. The method of claim 1 wherein the corrosion inhibiting compound has emulsification properties and said emulsion has the substantial absence of a non-corrosion inhibiting emulsification compound.
3. The method of claim 1 wherein said emulsion additionally comprises an emulsifying amount of an emulsification compound.
4. The method of claim 1 wherein said aqueous phase comprises water.
5. The method of claim 4 wherein the water is produced water from an oil well.
6. The method of claim 4 wherein said oil phase, other than the corrosion inhibiting compound, comprises an organic solvent.
7. The method of claim 4 wherein said aqueous phase additionally comprises a water soluble corrosion inhibitor, scale inhibitor, or biocide.
8. The method of claim 7 wherein said aqueous phase additionally comprises a water soluble salt in a concentration such that he density of said emulsion is greater than that of the water present in the well.
9. The method of claim 4 wherein said aqueous phase additionally comprises a water soluble salt in a concentration such that the density of said emulsion is greater than that of the water present in the well.
10. The method of claim 4 wherein the oil soluble corrosion inhibitor is
    a. an amide,
    b. an imidazoline,
    c. a carboxylic acid,
    d. an amine,
    e. a pyridine compound,
    f. a heterocyclic sulfur compound,
    g. a quinoline compound, or
    j. salts, quats, or polymers of any of the above
11. The method of claim 4 wherein the introduction of said emulsion to the well occurs more than 13 days after the most recent substantially similar treatment.
12. The method of claim 11 wherein the introduction of said emulsion to the well occurs more than 29 days after the most recent substantially similar treatment.
13. The method of claim 12 wherein a sufficient quantity of said emulsion is introduced into the well that at least 50% of the volume of the annulus is filled with said emulsion.
14. The method of claim 4 wherein the introduction of said emulsion to the well occurs prior to the concentration of the corrosion inhibiting compound in any produced fluids of the well being less than 50% of the maximum of such concentration after the most recent substantially similar treatment.
15. The method of claim 4 wherein there is a substantial absence of a flush immediately subsequent to the introduction of said emulsions to the well.

* * * * *

UNITED STATES PATENT AND TRADEMARK OFFICE
CERTIFICATE OF CORRECTION

PATENT NO. : 5,027,901

DATED : July 2, 1991

INVENTOR(S) : French et al.

It is certified that error appears in the above-identified patent and that said Letters Patent is hereby corrected as shown below:

Column 1, line 52, delete "000" and insert therefore -- 1000 --.

Column 4, line 15, delete "dicooodimethyl" and insert therefore -- dicocodimethyl --.

Column 9, claim 1, line 36, should read as follows:

-- 1. A method of inhibiting corrosion in an oil well comprising introducing to the annulus of a well an effective amount of a pourable emulsion comprising 50 to 95 volume percent of a discontinuous aqueous phase, and

UNITED STATES PATENT AND TRADEMARK OFFICE
CERTIFICATE OF CORRECTION

PATENT NO. : 5,027,901
DATED : July 2, 1991
INVENTOR(S) : French et al It is certified that error appears in the above-identified patent and that said Letters Patent is hereby corrected as shown below:

5 to 50 volumne percent of a continuous oil phase, said oil phase containing a corrosion inhibiting amount of an oil soluble corrosion inhibiting compound.

Signed and Sealed this

Seventeenth Day of May, 1994

Attest:

BRUCE LEHMAN

*Attesting Officer*      *Commissioner of Patents and Trademarks*